(12) United States Patent
Marriott

(10) Patent No.: US 7,354,113 B2
(45) Date of Patent: Apr. 8, 2008

(54) POWERED SPINNING HUBCAP

(76) Inventor: James Marriott, 7329 W. Airway Ct., Suite D, Boise, ID (US) 83709-8314

( * ) Notice: Subject to any disclaimer, the term of this patent is extended or adjusted under 35 U.S.C. 154(b) by 0 days.

(21) Appl. No.: 11/468,703

(22) Filed: Aug. 30, 2006

(65) Prior Publication Data

US 2007/0046096 A1   Mar. 1, 2007

Related U.S. Application Data

(60) Provisional application No. 60/712,882, filed on Aug. 30, 2005.

(51) Int. Cl.
 *B60B 7/04* (2006.01)
(52) U.S. Cl. .............................. 301/37.25; 301/37.109
(58) Field of Classification Search ........... 301/37.101, 301/37.102, 37.25, 37.108, 37.109; 40/587
See application file for complete search history.

(56) References Cited

U.S. PATENT DOCUMENTS

| 3,005,906 | A | | 10/1961 | Butler, Jr. |
| 3,155,430 | A | * | 11/1964 | Schindler ................. 301/37.25 |
| 3,158,946 | A | | 12/1964 | Upchurch |
| 5,490,342 | A | | 2/1996 | Rutterman et al. |
| 5,659,989 | A | | 8/1997 | Hsiao et al. |
| 5,743,544 | A | * | 4/1998 | Weaver ....................... 280/249 |
| 6,120,104 | A | | 9/2000 | Okamoto et al. |
| 6,382,820 | B1 | | 5/2002 | Chung |
| 6,443,530 | B1 | * | 9/2002 | Lee .......................... 301/37.25 |
| 6,637,831 | B1 | | 10/2003 | Kim |
| 6,655,061 | B1 | | 12/2003 | Good |
| 2005/0190046 | A1 | * | 9/2005 | Young et al. ................ 340/432 |
| 2006/0049684 | A1 | * | 3/2006 | Johnson et al. ........... 301/37.25 |
| 2006/0208922 | A1 | * | 9/2006 | Wilson ................... 340/825.57 |

* cited by examiner

*Primary Examiner*—Russell D. Stormer
(74) *Attorney, Agent, or Firm*—Robert L. Shaver; Dykas, Shaver & Nipper, LLP

(57) ABSTRACT

A hubcap spinning device is disclosed which utilizes the rotation of a vehicle wheel to turn a hubcap. The hubcap can turn at a different speed and a different direction than the rotation of the wheel. The hubcap uses a central sun gear that nrovides toruue to planetary gears and a ring rigidly connected to a rotatable hubcap. By using different gear ratios or number of gears, the direction and relative speed of the rotating hubcap may be changed.

13 Claims, 7 Drawing Sheets

POWERED SPINNING HUBCAP

BACKGROUND OF THE INVENTION

Field of the Invention. The invention relates to spinning hubcaps, and more specifically to hubcaps which spin at different rates or directions from the wheel to which they are attached.

It has become popular in automotive trends for hubcaps and wheels to become more decorative. One way in which this is accomplished is by hubcaps which attach to the wheel and which have a portion of the hubcap which rotates freely and independently of the wheel. Thus when a vehicle comes to a stop the hubcaps continue spinning even though the wheels of the car continue spinning. They come in many different sizes and styles, and all add the feature of motion of enhanced interest to a vehicle wheel.

SUMMARY OF THE INVENTION

The invention is a vehicle hubcap rotation device which causes the hubcap of a vehicle to rotate based on wheel rotation. The hubcap can rotate at a different speed than the wheel to which it is attached. The rotation can be in the same direction as the wheel, and the rotation can also be in the reverse direction in which the vehicle wheel is turning. The hubcap can also continue rotating while the wheel is stationary.

This rotation, which can be different in speed or direction from the rotation of the vehicle wheel, is achieved by a device which attaches to the vehicle wheel. The device can attach by a number of different means, including attaching to the threaded studs of the wheel. The attachment would typically be made by a connector assembly, which can include a number of connectors being threaded onto the threaded studs of a wheel, and being locked in place. Attached to the connector assembly is a static piece which is free to rotate. It is eccentrically weighted, so that the weight on one side of the static piece causes it to remain in a stationary orientation as the vehicle wheel turns. The static piece can take the form of a disc, a plate, a bar, or other shapes. In each case, the static piece is free to rotate independently of the vehicle wheel, and has a weight distribution which causes the static piece to maintain a consistent orientation, due to gravity.

Another part of the device is a gear such as a sun gear, which is rigidly coupled to the vehicle wheel through the connection assembly. In one configuration, the shaft of the sun gear would extend through the static piece, by means of a shaft attached to the connector assembly that connects to the vehicle wheel studs. As the vehicle wheel turns, the sun gear and its shaft also turn, but the static piece remains in a constant orientation. Arranged around the sun gear, is an annular ring gear. Between the sun gear and the ring gear is at least one planetary gear which interacts with both the sun gear and the ring gear. The planetary gear or gears are mounted on shafts attached to the static piece. As the sun gear rotates in relation to the static piece, the sun gear causes the planetary gears to rotate and to spin the ring gear which is rigidly attached to the hubcap, and held in contact with the planetary gears. Thus as the vehicle wheel turns, the hubcap is caused to turn at a speed and direction determined by the gearing selected, which can be at a different rotation speed and direction from the vehicle wheel.

Other configurations are also possible, such as having the planetary gears mounted so that one planetary gear does not touch both the sun gear and the ring gear. For instance, one planetary gear or a set of planetary gears could be mounted adjacent to the sun gear, and would interact with the sun gear and another planetary gear or set of planetary gears in a position further from the sun gear, and that second set of planetary gears would interact with the ring gear. If the set of planetary gears interacts with both the sun gear and ring gear, the hubcap would be caused to spin in the reverse direction as the vehicle wheel. If two sets of planetary gears are used, in whatever numbers are arranged between the sun gear and annular gear, the hubcap would rotate in the same direction as the vehicle wheel but at a different RPM. Different RPMs of rotation can be achieved either in a forward or backward rotation, by use of different sized sun and ring gears.

The speed of rotation of the hubcap may be changed by using different numbers of gear teeth on the sun gear, ring gear, or both. Also, the makeup of the planet gears must be such that they still "shim" the space between the ring and sun gears.

An automatic transmission for the device is possible, in which energy is transmitted through a fluid, magnetic, or other coupling. It may be desirable to include a freewheel on the hubcap, so that if the vehicle came to a rapid stop, the hubcap could continue spinning. Such a freewheel could be a sprag clutch. A clutch of some kind could also be included, so that if a vehicle wheel increased RPMs rapidly, the gears of the hubcap drive would not be damaged, and also if the vehicle wheel stopped rotating suddenly, the hubcap could continue turning and not be damaged by an instantaneous stop. Such a clutch would be rotationally coupled through any of the members (such as the static piece-sun connection). The torque-limiting clutch would likely be in the same location, and could for example be a pin clutch or a conventional industrial clutch pack.

The driving force of the vehicle wheel to the spinning hubcap could be through the use of wheels instead of gears, with the edges of the wheels contacting adjacent wheels, and using friction to transmit force. Although the device of the invention is shown as being geared or using wheels to transmit motion, it is to be understood that using mechanical equivalents such as belt drives, magnetic drives or chain and gears could be substituted for a gear driven mechanism.

DESCRIPTION OF THE PREFERRED EMBODIMENTS

Figure 1:
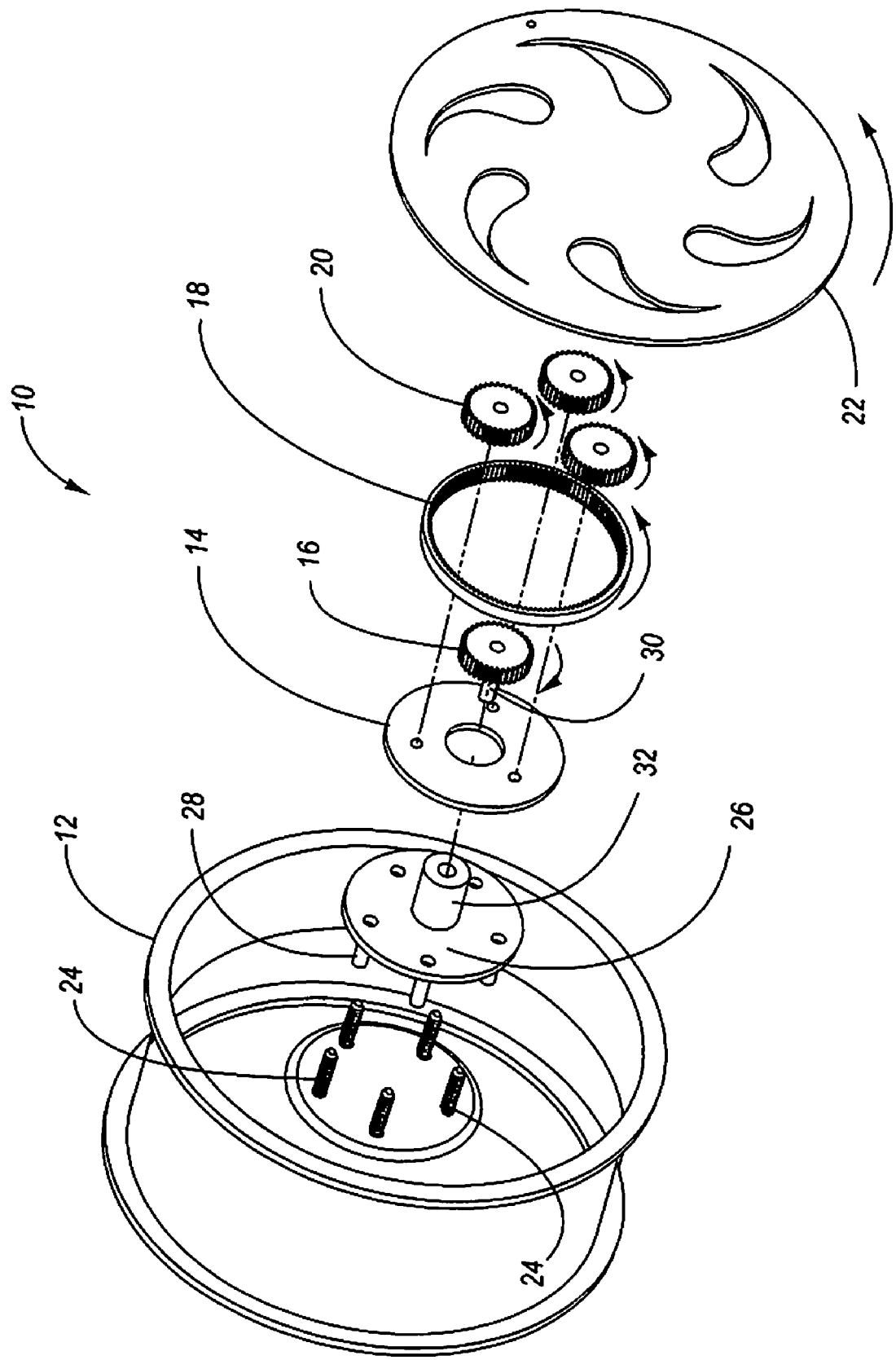
FIG. 1 is an exploded view of the geared hubcap of the invention, configured for reverse rotation.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

A preferred embodiment of the invention is shown in FIGS. 1 through 5. FIG. 1 shows one embodiment of the geared hubcap of the invention which includes the vehicle wheel 12 with wheel studs 24. Attached to the wheel studs 24 is a connector assembly 26. The connector assembly 26 includes stud attachments 28. The stud attachments 28 are threaded onto the wheel studs 24 and secure the connector assembly 26 to the vehicle wheel. Thus when the vehicle wheel 12 rotates, the connector assembly 26 also rotates. Alternately, the wheel studs can extend through holes in the connector assembly 26 and be secured with nuts. Obviously other connection strategies can be utilized, as are known in the art.

Connected to the connector assembly 26 is a static piece 14. The static piece 14 is shown in FIG. 1 as being disc shaped, but could also be configured in the form of a plate, bar, a rod, or other shapes. The static piece 14 is rotatably attached to the connector assembly 26 and is eccentrically weighted so that the static piece tends to maintain a constant orientation due to gravity. It is free to rotate on the connector assembly to achieve this stable orientation. Rigidly attached to the connector assembly is a sun gear 16, with a sun gear shaft 30 being rigidly attached to the connector assembly 26, so that as the vehicle wheel 12 rotates the sun gear 16 also rotates. The direction of rotation is shown by the arrows adjacent to the rotating parts.

Surrounding the sun gear is a ring gear 18, which is held in place by the structure of the geared hubcap device. The ring gear 18 is operationally attached to a hubcap spinner 22 so that the turning of the ring gear causes turning of the hubcap spinner 22. This connection may be by a rigid connection, or by a non-direct connection. In the preferred embodiment, when the ring gear rotates, the hubcap spinner 22 also rotates in the same direction and speed as the ring gear.

In the configuration shown in FIG. 1, the space between the inner edge of the ring gear 18, and the outer edge of the sun gear 16 is occupied by three planetary gears 20. As the sun gear 16 rotates, the planetary gears 20 are caused to rotate in the opposite direction. The planetary gears interact with both the sun gear 16 and the ring gear 18, and thus in this configuration would cause the hubcap spinner 22 to rotate in the opposite direction as the vehicle wheel rotation.

Included in the assembly is a clutch 32 which in this case is shown being attached to the connector assembly 26. The clutch 32 would allow the hubcap spinner 22 and the associated gears to be disengaged from the vehicle wheel, and to continue spinning if the vehicle wheel came to a sudden stop, or to remain stationary if the vehicle wheel suddenly spun rapidly, as in a high acceleration start from a standing position. The clutch 32 can take the form of a sprag clutch, and could also use such standard clutching mechanisms as a fluid connection, or using a magnetic linkage. The clutch 32 can take the form of a freewheel and allow free rotation of the hubcap spinner in a chosen direction. In the configuration shown in FIG. 1, one planetary gear 20 could also be substituted for the three that are shown.

Figure 3:
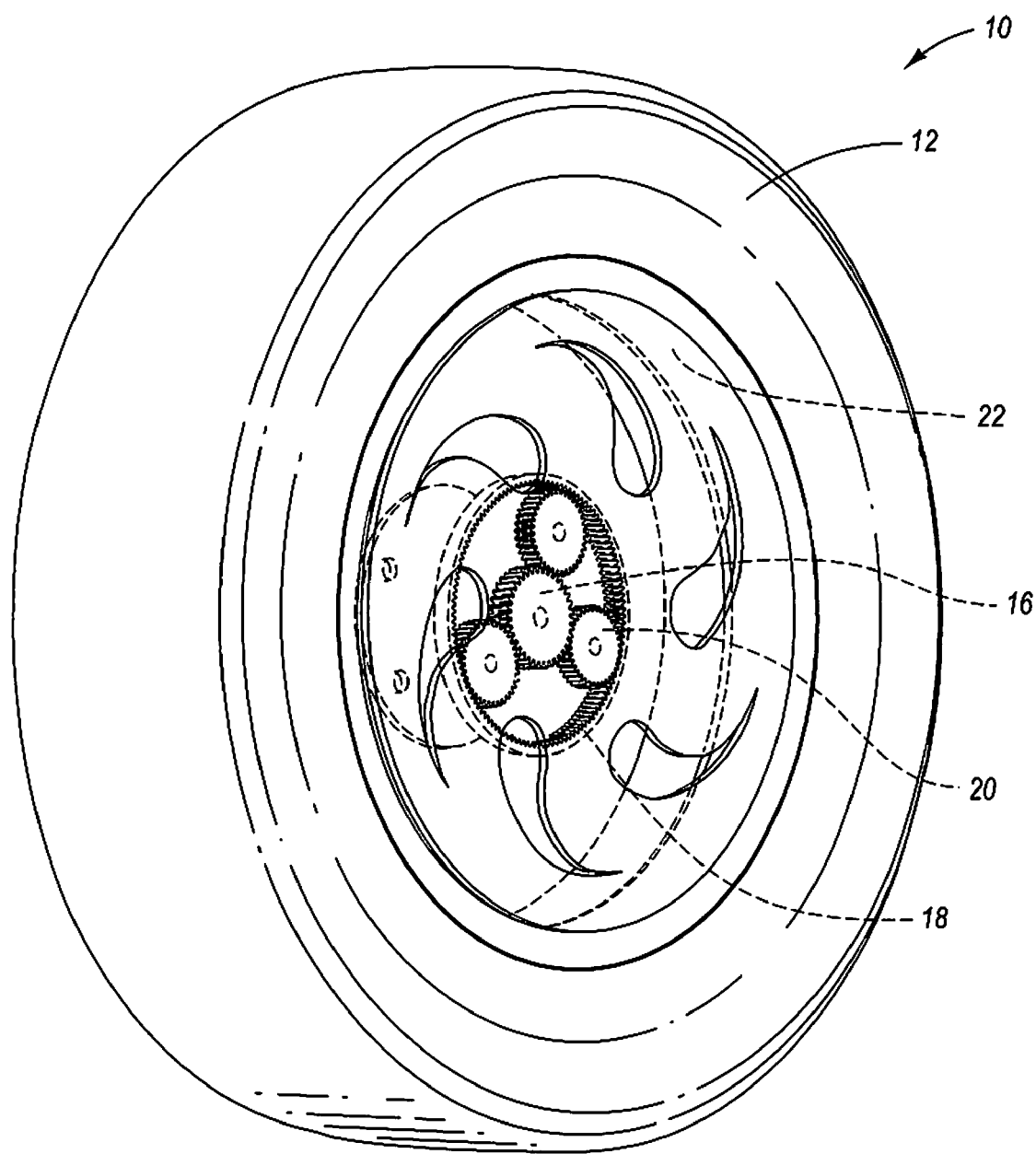
FIG. 3 is a perspective view of the geared hubcap of the invention, with gearing for reverse rotation.

FIG. 3 shows a perspective view of the assembled geared hubcap of FIG. 1.

Figure 2:
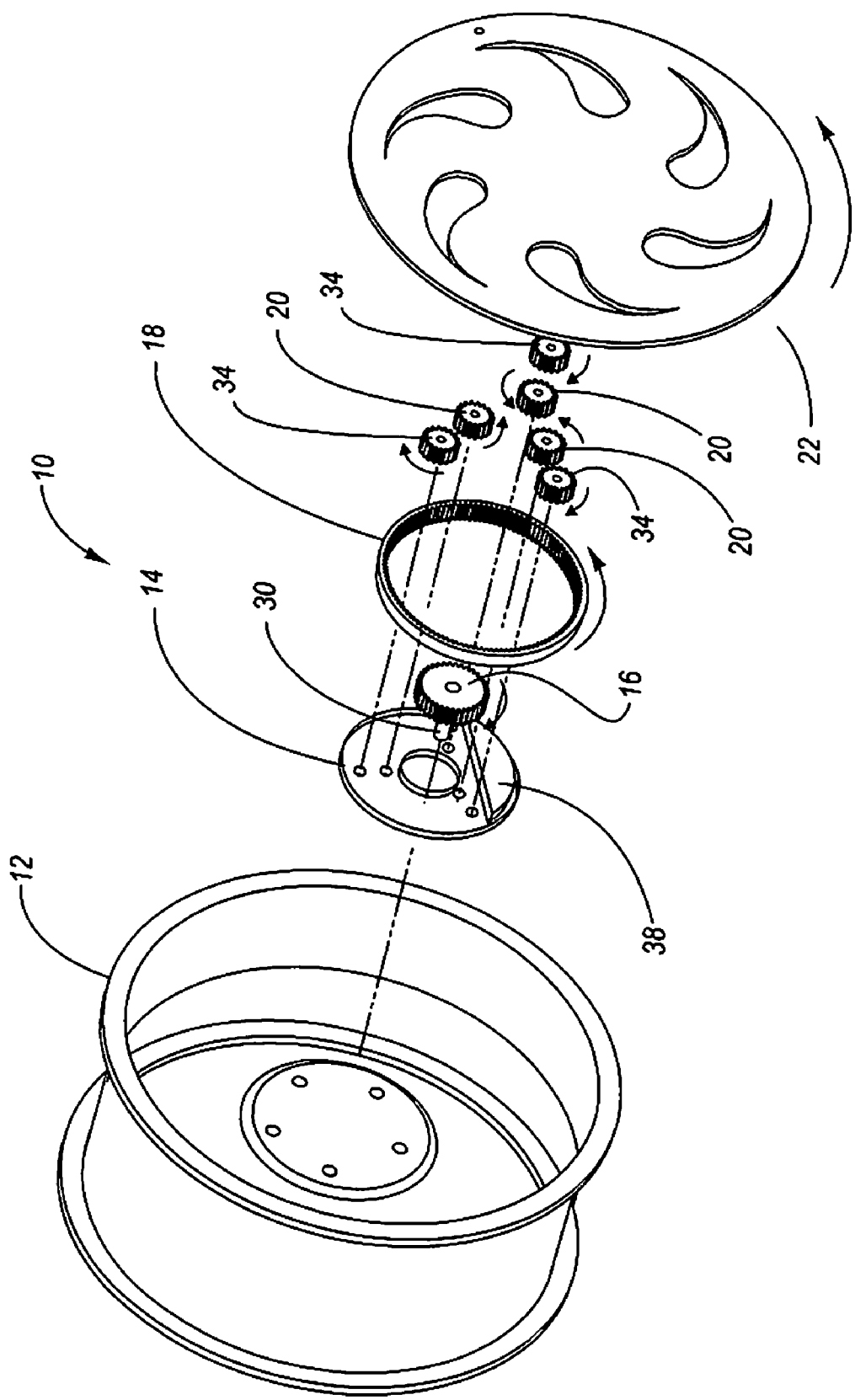
FIG. 2 is an exploded view of the geared hubcap of the invention, geared for forward rotation.
Figure 4:
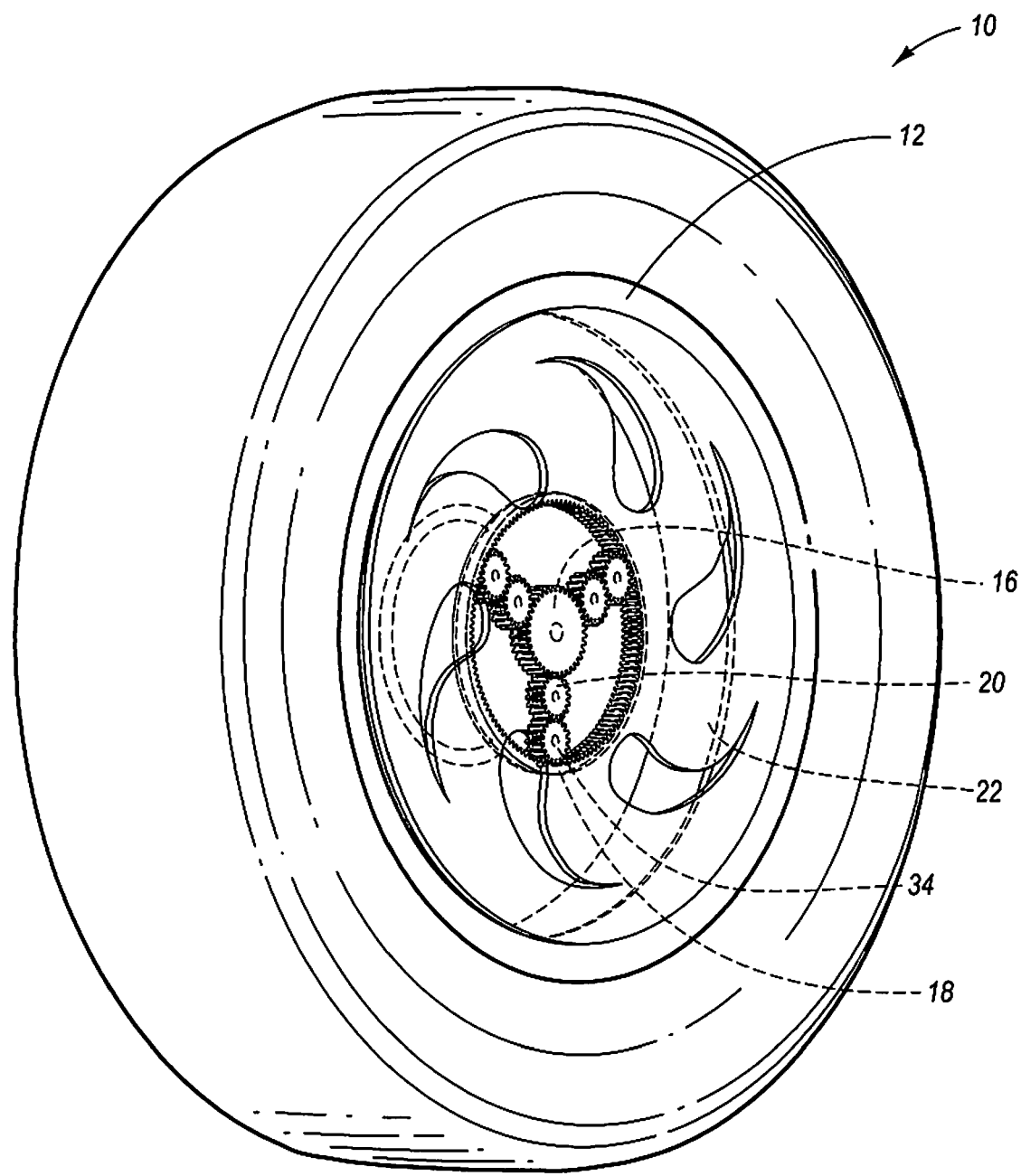
FIG. 4 is a perspective view of the geared hubcap of the invention, with gearing for forward rotation.

FIG. 2 shows a different embodiment of the geared hubcap of the invention. In this configuration which is also shown in FIG. 4, the planetary gears 20 interact with a set of secondary planetary gears 34. By using a set of secondary planetary gears 34 the direction of rotation of the hubcap spinner 22 is in the same direction as the vehicle wheel 12 rather than three pairs of planetary and secondary planetary gears being used as shown in FIGS. 2 and 4, a single pair of planetary gear 20 combined with secondary planetary gear 34 can be utilized in order to reduce the moving parts of the device. A counterweight 38 may be attached to the static piece, as shown.

Figure 5:
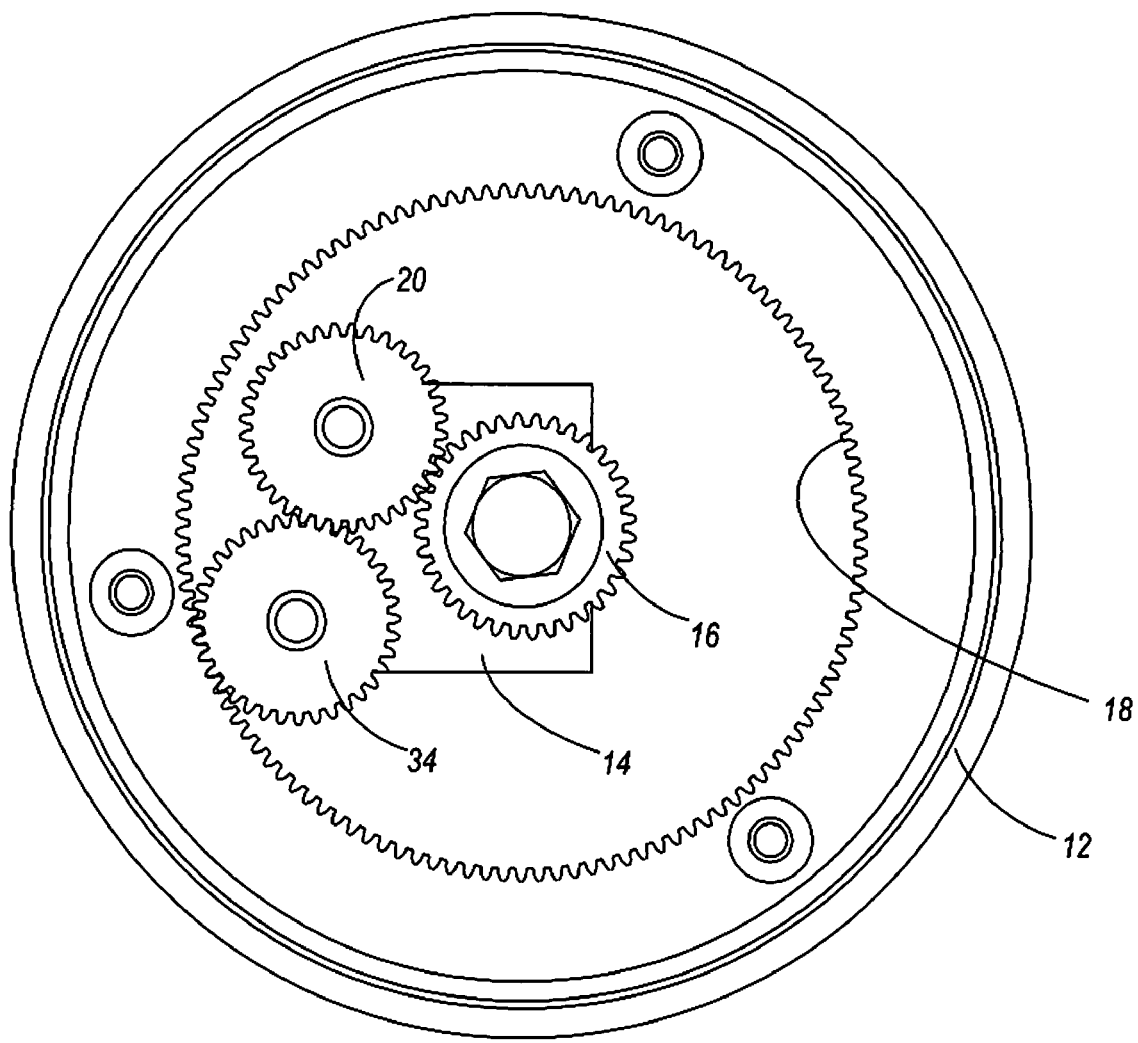
FIG. 5 is a front view of the geared hubcap of the invention, with a single planetary gear, and a single secondary planetary gear.

FIG. 5 shows a version of the geared hubcap of the invention which utilizes a single planetary gear 20, a single secondary planetary gear 34, with the two being connected to the sun gear 16 and the ring gear 18.

Figure 6:
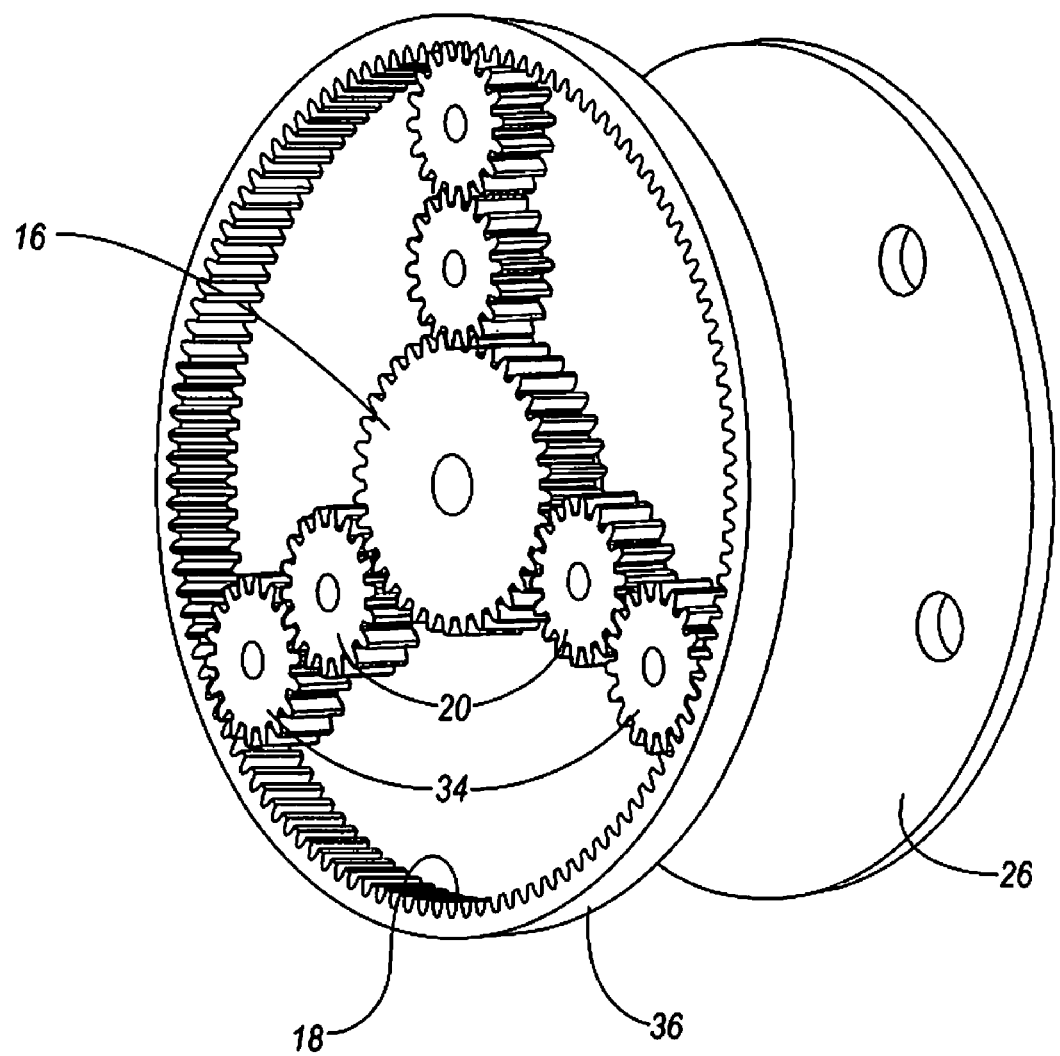
FIG. 6 is a perspective view of the geared hubcap of the invention, with gearing for forward rotation and showing the gear case and the connector assembly.

FIG. 6 shows the version of the geared hubcap 10 with the connector assembly being a plate with holes for the wheel studs 24, attached to a gear case 36, in which are housed the sun gear 16, the planetary gears 20, secondary planetary gears 34, and the ring gear 18. The clutch in this version is mounted between the gear case 36 and the connector assembly 26.

Figure 7:
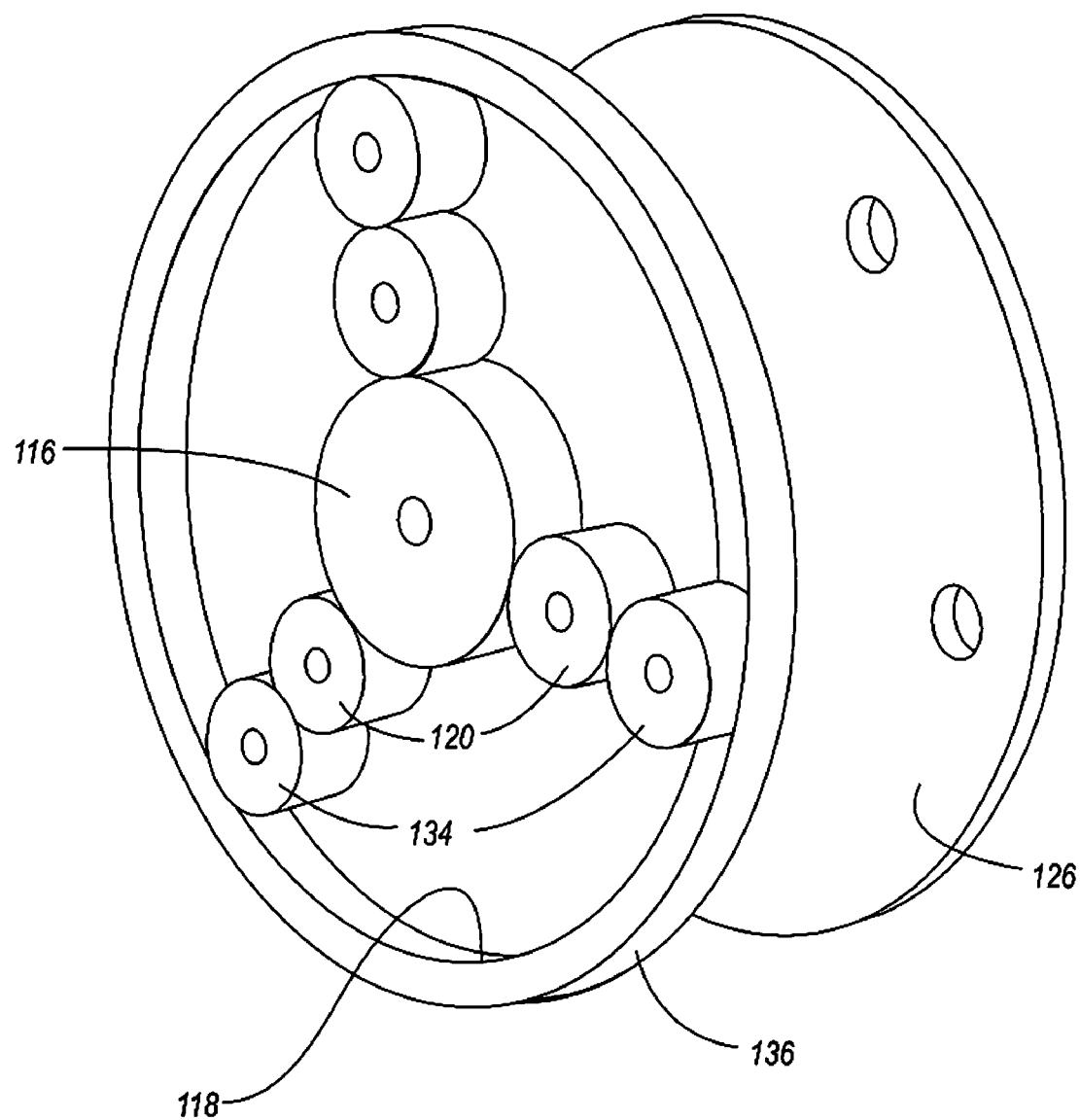
FIG. 7 is a perspective view of the geared hubcap of the invention, which utilizes wheels to transmit power in a gearlike fashion.
}

FIG. 7 shows the device in a form which utilizes wheels instead of gears to transmit power, with a sun wheel 116, planetary wheels 120, secondary planetary wheels 134, connector assembly 126, and wheel case 136. In this configuration, the wheels act as a type of gear.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A vehicle hubcap rotation device for attachment to a vehicle wheel, comprising:
    a connector assembly for attaching said hubcap rotation device to said vehicle wheel;
    a static piece rotatably attached to the connector assembly, which remains constant in orientation as said vehicle wheel rotates;
    a sun gear rigidly attached to said connector assembly, with said sun gear configured for rotation corresponding to the rotation of the vehicle wheel;
    one or more planetary gears mounted for interaction with said sun gear;
    a ring gear rigidly coupled to a rotatable hubcap, with said ring gear positioned around said sun gear, and configured for engagement with said one or more planetary gears;
    in which said hubcap is driven by said gears to rotate at a speed of rotation which is determined by the gear ratios of said gears, with said speed of rotation which can be different than the speed of rotation of the vehicle wheel to which it is attached.

2. The vehicle hubcap rotation device of claim 1 which said connector assembly further includes multiple connectors for attachment to the lugs of the vehicle wheel.

3. The vehicle hubcap rotation device of claim 1 in which said connector is a plate with lug attachments.

4. The vehicle hubcap rotation device of claim 1 which comprises wheels in place of the gears of claim 1, with said wheels transmitting motion by friction between contacting wheels.

5. The vehicle hubcap rotation device of claim 1 in which said static piece further includes a counterweight for maintaining the orientation of the static piece.

6. The vehicle hubcap rotation device of claim 1 in which said hubcap rotates in the same direction as the vehicle wheel, but at a different rpm than the vehicle wheel.

7. The vehicle hubcap rotation device of claim 1 in which the hubcap rotates in the opposite direction as the vehicle wheel.

8. The vehicle hubcap rotation device of claim 1 in which said sun gear interacts with one or more planetary gears, and the planetary gear(s) interact with the hubcap through said ring gear.

9. The vehicle hubcap rotation device of claim 1 which further includes a clutch, which allows the hubcap to continue spinning if the vehicle wheel suddenly stops spinning.

10. The vehicle hubcap rotation device of claim 9 in which said clutch is configured to allow the hubcap to continue spinning if the vehicle wheel suddenly stops spinning or if the vehicle wheel suddenly increased in rotation speed.

11. The vehicle hubcap rotation device of claim 1 which further includes a freewheel, so that the hubcap can continue to spin independently of the rotation of the vehicle wheel.

12. The vehicle hubcap rotation device of claim 1 in which said sun gear interacts with one or more planetary gears, and said first planetary gear(s) interact with a set of second planetary gears, with said second planetary gears interacting with said ring gear, and thus causing the hubcap to rotate in the same direction as the vehicle wheel.

13. A vehicle hubcap rotation device for attachment to a vehicle wheel, comprising:
   a connector assembly for attaching said hubcap rotation device to said vehicle wheel;
   a static piece rotatably attached to the connector assembly, which remains constant in orientation as said vehicle wheel rotates;
   a sun gear rigidly attached to said connector assembly, with said sun gear configured for rotation corresponding to the rotation of the vehicle wheel;
   one or more planetary gears mounted for interaction with said sun gear;
   one or more secondary planetary gears for interaction with said planetary gears;
   a ring gear rigidly coupled to said hubcap, and configured for engagement with said secondary planetary gears and configured for free rotation as driven by said gears;
   in which said hubcap is driven by said ring gear to rotate at a speed of rotation which is determined by the gear ratios of said gears, with said speed of rotation which can be different than the speed of rotation of the vehicle wheel to which it is attached, and can be the reverse or the same direction of rotation as the direction of rotation of said vehicle wheel.

* * * * *